(12) United States Patent
Reichle et al.

(10) Patent No.: US 8,157,185 B2
(45) Date of Patent: Apr. 17, 2012

(54) STRIKE ATTACHMENT RAILROAD SIGNAL LINE CONNECTOR

(75) Inventors: David L. Reichle, Bradenton, FL (US); Gary E. Choate, Denver, CO (US)

(73) Assignee: Fastrax Industries, Inc., Littleton, CO (US)

( * ) Notice: Subject to any disclaimer, the term of this patent is extended or adjusted under 35 U.S.C. 154(b) by 88 days.

(21) Appl. No.: 12/692,358

(22) Filed: Jan. 22, 2010

(65) Prior Publication Data

US 2010/0187322 A1 Jul. 29, 2010

Related U.S. Application Data

(60) Provisional application No. 61/146,861, filed on Jan. 23, 2009, provisional application No. 61/178,626, filed on May 15, 2009.

(51) Int. Cl.
*E01B 11/54* (2006.01)

(52) U.S. Cl. ........ 238/14.2; 238/338; 238/378; 246/428

(58) Field of Classification Search ............... 238/14.14, 238/14.05, 14.2, 14.15, 14.12, 14.13; 246/428; 248/216.1, 216.4, 217.3, 228.1
See application file for complete search history.

(56) References Cited

U.S. PATENT DOCUMENTS

| | | | | |
|---|---|---|---|---|
| 2,875,969 A * | 3/1959 | Thompson | ...................... | 248/72 |
| 2,886,088 A | 5/1959 | Brancato | | |
| 2,910,567 A * | 10/1959 | Holstein | ...................... | 219/213 |
| 3,233,097 A | 2/1966 | Watkins | | |
| 3,243,573 A | 3/1966 | Weisse et al. | | |
| 3,264,472 A | 8/1966 | Simmons | | |
| 3,349,722 A * | 10/1967 | Davis | ............................. | 104/279 |
| 3,394,251 A | 7/1968 | King et al. | | |
| 3,439,161 A | 4/1969 | McElwee et al. | | |
| 3,697,746 A | 10/1972 | Patterson et al. | | |
| 3,830,427 A * | 8/1974 | Polidori | ...................... | 238/14.14 |
| 4,195,805 A | 4/1980 | Keep, Jr. | | |
| RE31,081 E | 11/1982 | Keep, Jr. | | |
| 4,391,425 A * | 7/1983 | Keep, Jr. | ........................ | 246/428 |
| 4,429,845 A * | 2/1984 | Stover et al. | ................... | 246/428 |
| 4,671,475 A | 6/1987 | Widmer | | |
| 5,004,190 A * | 4/1991 | Montierth et al. | ............. | 246/428 |
| 5,127,577 A * | 7/1992 | Lynch et al. | ................... | 238/378 |
| 5,148,981 A * | 9/1992 | Lynch et al. | ................... | 238/351 |
| 5,348,257 A * | 9/1994 | Ocampo | ........................ | 246/220 |
| 5,824,997 A | 10/1998 | Reichle et al. | | |
| 5,941,482 A * | 8/1999 | Santagata | ....................... | 246/428 |
| 6,104,010 A * | 8/2000 | Reichle et al. | ................. | 219/537 |
| 6,186,799 B1 * | 2/2001 | Mello | .............................. | 439/92 |
| 7,321,107 B2 * | 1/2008 | Yagnik et al. | .................. | 219/540 |
| 7,530,502 B2 * | 5/2009 | Sherriff et al. | ................. | 238/338 |
| D623,508 S * | 9/2010 | Reichle et al. | ................. | D8/394 |
| 2006/0032934 A1 * | 2/2006 | Reichle | ........................ | 238/14.05 |
| 2006/0150563 A1 * | 7/2006 | Naheem | ........................... | 52/698 |
| 2008/0257973 A1 * | 10/2008 | Reichle | ........................... | 238/351 |
| 2010/0187322 A1 * | 7/2010 | Reichle et al. | ................. | 238/14.2 |
| 2010/0192334 A1 * | 8/2010 | Reichle et al. | ................... | 24/457 |
| 2010/0219256 A1 * | 9/2010 | Williams | .................... | 238/14.05 |

* cited by examiner

*Primary Examiner* — S. Joseph Morano
*Assistant Examiner* — Jason C Smith
(74) *Attorney, Agent, or Firm* — Marsh Fischmann & Breyfogle LLP (57) ABSTRACT

A system and method for non-invasively attaching components to railroad track rails. More specifically, a connector is provided that can quickly and effectively electrically connect one or more signal lines with a surface of the track rail. In one embodiment, the non-invasive connector utilizes a spring clamp to form an electrical connection with a flange portion of the track rail. First and second opposing members of the spring clamp include teeth that mar the surface of the flange to form an electrical connection between the track rail and the spring clamp when the flange is forced between these opposing members. A signal line is electrically connected to the spring clamp.

19 Claims, 9 Drawing Sheets

STRIKE ATTACHMENT RAILROAD SIGNAL LINE CONNECTOR

CROSS-REFERENCE TO RELATED APPLICATION

This application claims priority and the benefit of the filing date under 35 U.S.C. 119 to U.S. Provisional Application No. 61/146,861, entitled, "STRIKE ATTACHMENT RAILROAD SIGNAL LINE CONNECTOR," filed on Jan. 23, 2009, and U.S. Provisional Application No. 61/178,626, entitled, "STRIKE ATTACHMENT RAILROAD SIGNAL LINE CONNECTOR," filed on May 15, 2009, the contents of both of which are incorporated herein as if set forth in full.

FIELD

The present disclosure relates to a friction clamp system that allows for connecting objects to a railroad track rail and/or for forming an electrical connection between such a track rail and an electrical conductor such as, for example a signal line, wire or cable.

BACKGROUND

In typical railroad systems, a length of many miles of track may be divided into a plurality of successive adjacent blocks that may be further subdivided into cut circuits (collectively track sections) for control, monitoring, heating and/or maintenance purposes. Each track section forms a track circuit wherein the track rails are utilized to carry electrical signals. In some cases, the track rails in each track section are electrically insulated from the track rails of adjacent track sections such that each circuit may be utilized individually for control and monitoring purposes.

Monitoring the track circuits provide means for detecting the presence or absence of a railroad vehicle, equipment and/or any other foreign apparatus that activates or otherwise interacts with a given track section. Information obtained from such monitoring may be used for traffic control purposes thereby allowing trains to operate at safe speeds and/or to identify train locations as the trains pass from one-track section to another. For instance, it is customary to detect the presence of a railroad vehicle in a particular track section by detecting the presence of a short circuit or other variation in a signal being monitored through the rails of the track section. That is, when a railroad vehicle enters a particular track section, the wheels and axle of the vehicle provide a short circuit between the rails of that track section or otherwise alter the track circuit in the track section (e.g., produce a change in impedance). Based upon detection of such a short circuit or signal variation, one or more control signals may be generated to operate, for example, track switches, railroad crossing gates, communications systems, maintenance equipment, etc. The track rails, in addition to carrying signals utilized for train detection and control, may also carry other signals (e.g., at different frequencies). Such signals may include, without limitation, train-to-wayside, wayside-to-train and train-to-train communications.

Irrespective of the type or purpose of the signals passing through the track sections, it is generally necessary to electrically interconnect one or more electrical conductors, wires or cables (hereafter signal lines) to the track rail to provide, receive and/or transfer such signals.

SUMMARY

One objective of the present disclosure is to provide an improved system and method for electrically coupling an electrical conductor (e.g., a signal line) to a track rail. Another objective of the present disclosure is to provide a connector for coupling an electrical connector to a track rail that may be quickly and securely attached to the rail. A further objective is to provide a coupling that may be quickly and securely attached to a track rail to support one or more components relative to the track rail. These and/or other objectives may be accomplished by various systems and methods (i.e., utilities) that utilize a friction clamp that securely attaches to a track rail. In one arrangement, the friction clamp may electrically connect a signal conductor to a track rail. In another arrangement, the friction clamp may support a component relative to the rail.

According to a first aspect, a spring clamp electrical connector for making electrical connections with a railroad track rail is provided. The spring clamp is formed of an elastically deformable body having an upper member, a lower member and a closed end. The upper and lower members are disposed in a spaced and opposing relationship (e.g., opposing members) that is sized to receive a flange of a railroad track rail. That is, the upper and lower members and the closed end define a recess that is sized to receive the flange of the railroad track rail. The upper member includes at least a first upper tooth that has a base that is integrally formed with the upper member and extends away from its base to a gripping tip. The gripping tip extends below the bottom surface of the upper member such that it is at least partially disposed within the recess defined between the opposing members. Likewise, the lower member has at least a first tooth having a gripping tip that extends at least partially into the recess defined between the opposing members. At least the tips of these teeth are hardened such that they may penetrate the surface of the track rail to provide effective electrical contact between the rail and the spring clamp. Finally, the spring clamp electrical connector includes means for connecting a signal cable to the U-shaped body. Such means may include, without limitation, permanently attached signal cables and/or arrangements that permit removably coupling a signal line to the spring clamp.

The spring clamp may be designed in any manner that allows the opposing members to engage opposing surfaces of the track rail. In one arrangement, the opposing members are formed form a metal plate that is formed into a U-shaped body. Typically, the spacing between the opposing members is such that a portion of the track rail, such as the flange, may be disposed within this recess defined by the opposing members. This recess may be tapered. Accordingly, by driving a portion of the track rail into the tapered recess the opposing members be deflected from a static position. In one arrangement, the opposing members are spaced between about 1 cm and 4 cm centimeters apart. In this regard, the opposing members are adapted to receive the flange of most track rails. However, it will be appreciated that other arrangements are possible.

In order to maintain the anchor on the track rail, the opposing members each may include one or more teeth that are operative to engage the surface of the track rail. These teeth may have a hardness that is greater than the hardness of the track rail to facilitate engagement therewith and marring of the track rail surface to form an electrical connection. In one arrangement, at least the gripping tip of each tooth has a Rockwall hardness that is greater than about 40 and more typically greater than about 60. Such teeth may be separately formed and interconnected to the opposing members, or the teeth may be integrally formed within the opposing members.

In one arrangement, the teeth are formed from a plate member that is utilized to form the U-shaped body. In such an arrangement, the base of each tooth may be integrally formed with the plate member of the U-shaped body and may extend to its gripping tip. This gripping tip may be formed by the edge surfaces of the plate. In one arrangement, two edge surfaces form the tip where an included angle between the edge surfaces is acute. More preferably, such an included angle is less than about 60°. This results in a tooth gripping tip that is sharp enough to engage and mar the surface of a track rail flange in order to generate an effective electrical connection therewith. For instance, such a tooth may be formed of two adjacent edge surfaces of a plate member having a thickness of at least about $3/16^{th}$ of an inch and an included angle of about 60° or less. This may provide a sharp point for penetrating the outer surface of a track rail.

In one arrangement, the upper member and/or the lower member may have first and second opposing teeth. In one arrangement, each such opposing tooth may extend laterally from the edges of its respective member. To permit partially independent movement of such teeth, they may define a cantilevered member that may flex along its length. Furthermore, to improve movement between teeth interconnected to opposing sides of the upper or lower members, the member may include an aperture disposed through its surface that is located at least partially between the bases of such teeth. This may permit one tooth to flex (e.g., twist) free of an opposing tooth.

In one arrangement, the tips the teeth connected to a common member (e.g., upper member or lower member) are coplanar. In this regard, when applied to a track rail, these coplanar gripping tips may engage at multiple separate locations on the track rail. Further, when these teeth are cantilevered, they may flex to each engage the rail surface. In one arrangement, the teeth are backward swept to resist the removal of the spring clamp from a flange. In this regard, the gripping tip of one or more of the teeth interconnected to the upper and/or lower members may, between its tip and base, point in a direction towards the closed end of the U-shaped body.

In a further arrangement, one or more spring tabs may be interconnected to the closed end of the U-shaped member to facilitate the positioning of the U-shaped member relative to the flange. Such spring tabs may extend from a base interconnected to and/or integral with the closed end of the U-shaped body to a tip that is disposed at least partially within the recess defined by the U-shaped body.

In a further arrangement, the U-shaped member may include a galvanic coating. Such a galvanic coating may include a hot dipped galvanization coating. Other non-corrosive coatings and/or sacrificial coating may be utilized as well. These coatings include, without limitation, nickel coatings/plating, elastomeric coatings etc.

In another aspect, a utility is provided for electrically interconnecting adjacent track rails. In this utility, a first spring clamp may be driven onto the flange of a first track rail. The first spring clamp may be a first U-shaped member having one or more teeth that extend from the body of the U-shaped member into a recess between opposing members. Likewise, a second U-shaped member may be interconnected to the flange of a second track rail. Again, such a second U-shaped member spring clamp may have a recess that is sized to receive a portion of the track rail. Likewise, the second U-shaped spring clamp may have at least one tooth that extends from the body of the clamp partially into the recess. When these clamps are driven onto the flange, these teeth may engage and/or mar the surface of the rails to create a clean contact between the spring clamp and the underlying metal of the track rail.

In another aspect, a method for forming an electrical connector for use in making an electrical connection with a track rail is provided. The method includes die stamping a substantially flat metal plate to define a flat connector body having at least one tooth proximate to a first end of the body and at least one tooth proximate to a second end of the flat connector body. In such an arrangement, the base of each tooth is integrally formed with the flat connector body. Once the connector body and integrally defined teeth are stamped, each tooth may be bent such that the tip of the tooth is raised above the surface of the flat connector body. The flat connector body may then be bent into U-shaped where the first and second ends of the body are disposed in a spaced and opposing relationship. In such an arrangement, the tips of the teeth interconnected to the first and second ends may extend partially into a recess defined between the opposing ends. The tips of one or all the teeth may be hardened to provide a hardness that is in excess of the track rails to which they are intended to be connected. A signal cable may be interconnected to the U-shaped body.

In another aspect, a friction clamp is provided for attaching components to a track rail. The friction clamp has a U-shaped body with an upper member and a lower member that are spaced to receive a flange of a track rail. The upper member includes at least a first upper tooth that has a base that is integrally formed with the upper member and extends away laterally from the edge of the upper member to a gripping tip. The gripping tip extends below the bottom surface of the upper member such that it is at least partially disposed within the space between the opposing members. Likewise, the lower member has at least a first tooth having a gripping tip that extends laterally away from the member and at least partially into the space between the opposing members. The friction clamp further includes an attachment point for connecting a component to the clamp. This may securing a component to the clamp after the clamp has been secured to the track rail. Alternatively, the component may be attached to the clamp prior to engaging clamp with the track rail.

BRIEF DESCRIPTION OF THE DRAWINGS

For a more complete understanding of the present invention and further advantages thereof, reference is now made to the following Detailed Description taken in conjunction with the drawings in which.

DETAILED DESCRIPTION

Provided herein are various embodiments of a friction clamp connector for attaching components to a railroad track rail and/or electrically connecting a signal conductor to a railroad track rail.

Figure 1:
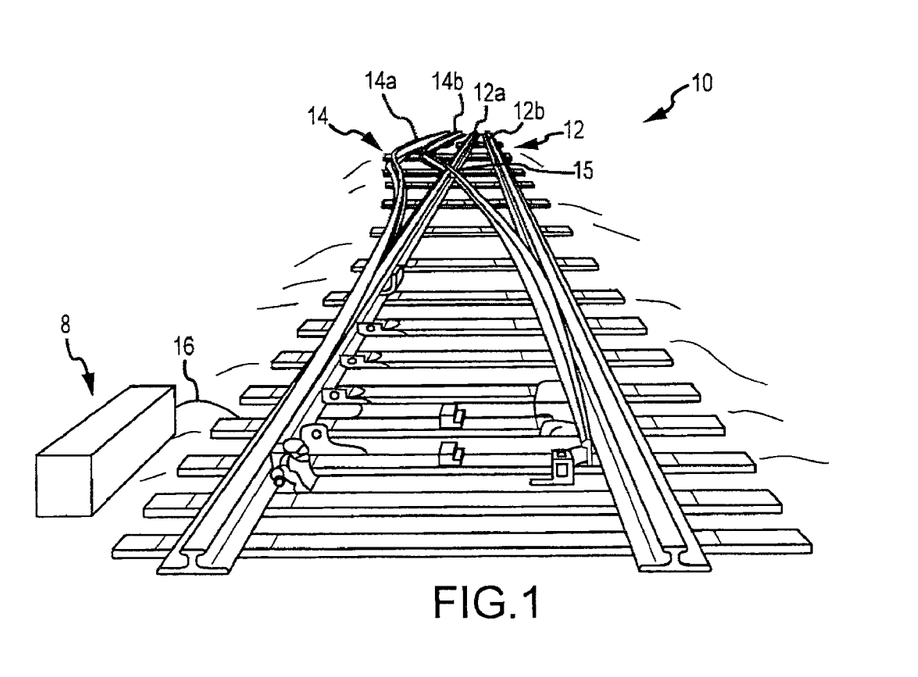
FIG. 1 shows a section of railroad track rails.

Referring to FIG. 1, a section of railroad track is generally identified by the reference numeral 10. As shown, the section of railroad track 10 includes a switching mechanism to switch trains between first and second tracks 12, 14. Each set of tracks 12, 14 includes two of track rails. As shown, the first track 12 includes a switching rail 12a and a stationary or stock rail 12b (also known as a running rail). Likewise, the second track 14 includes a stock rail 14a and a switching rail 14b. For purposes of controlling traffic, each track rail 12, 14 is electrically interconnected to a signal providing and monitoring system 8 that is located in proximity to the rail connection location The signal providing and monitoring system 8 is operative to redirect trains from the first track 12 to the second track 14 by mechanically moving the switching rails 12a and 14b relative to the stock rails 12b and 14a, respectively. Generally, a switch mechanism is mechanically interconnected to the switching rails 12a and 14b in order to move them in unison relative to the stock rails 12b and 14a at the connection point. The switching mechanism is typically attached to the rails with an electrically isolated linkage. In the case of switching rail 14b, mechanical movement may occur on both ends. That is, a first end of the switching rail 14b may be moved relative to the stock rail 12b and a second end of the switching rail 14b may be moved relative to a distal portion of switching rail 12a, where these rails cross. This point is sometimes referred to as a railroad "frog" 15. The frog 15 may in some instances be a passive spring actuated system that utilizes the pressure from the wheels of a passing railroad vehicle to permit railroad vehicle wheels to access the correct track. Alternatively, the frog 15 may be mechanically actuated/moved to permit railroad vehicle wheels to access the correct track. To effectuate switching of the switching rails and/or the railroad frog, the monitoring system 8 may detect the presence of approaching railroad vehicles and/or receive signals from approaching vehicles.

In a common arrangement, the signal providing and monitoring system 8 utilizes the track rails 12a, 12b and 14a, 14b to detect the presence and, generally, the speed of approaching railroad vehicles and/or to receive signals from the approaching railroad vehicles. In this regard, each set of track rails 12, 14 forms an electric circuit (i.e., track circuit) that is interconnected to the monitoring system 8 by one or more signal lines 16. In one arrangement, a resulting electrical circuit may be short circuited when the wheels and axle of an approaching railroad vehicle interconnects the track rails 12a, 12b or 14a, 14b. In another arrangement, the impedance of a signal changes due to the presence of an approaching railroad vehicle. The length of each track circuit depends upon various circumstances including the distance over which signals may be effectively sent, received and/or detected. Normally, such a track circuit will fall into the range of several feet to a few miles. To define such track circuits, the track rails may be divided into adjacent sections by providing insulated joints. Such insulated joints allow for electrically isolating adjacent sections to track rail from one another.

Electrically interconnecting any device to a track rail and/or connecting adjacent track rails generally requires interconnecting an electrical conductor (hereafter signal line or cable) to the structure of a given track rail 12, 14. This has traditionally entailed bolting or welding a conductor to the track rail. Bolting can result in galvanic action between dissimilar metals (e.g., steel and copper), which may also results in increased resistance over time. Such resistance may be a limiting factor in the length of the tack circuits and/or may result in ineffective signal transfer. Further, bolting requires penetrating the surface of the rail, which can structurally weaken a rail if not carefully located. Accordingly, the various signal line connectors provided herein are directed to electrically interconnecting a signal line 16 to surface of the track rail utilizing a substantially non-invasive connector that may be quickly and securely attached to a track rail.

Figure 2:
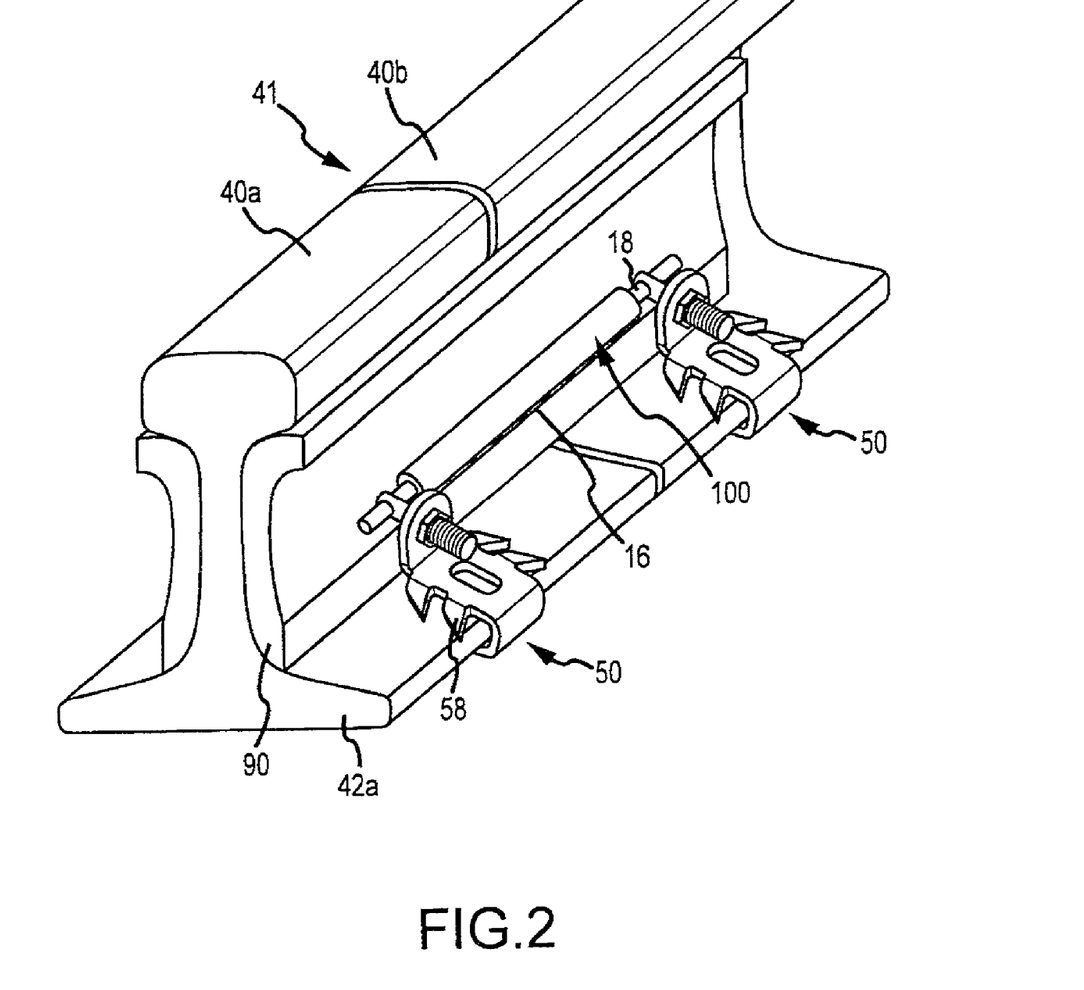
FIG. 2 shows a perspective view of an electrical connector that electrically interconnects adjacent sections of track rails.
Figure 3:
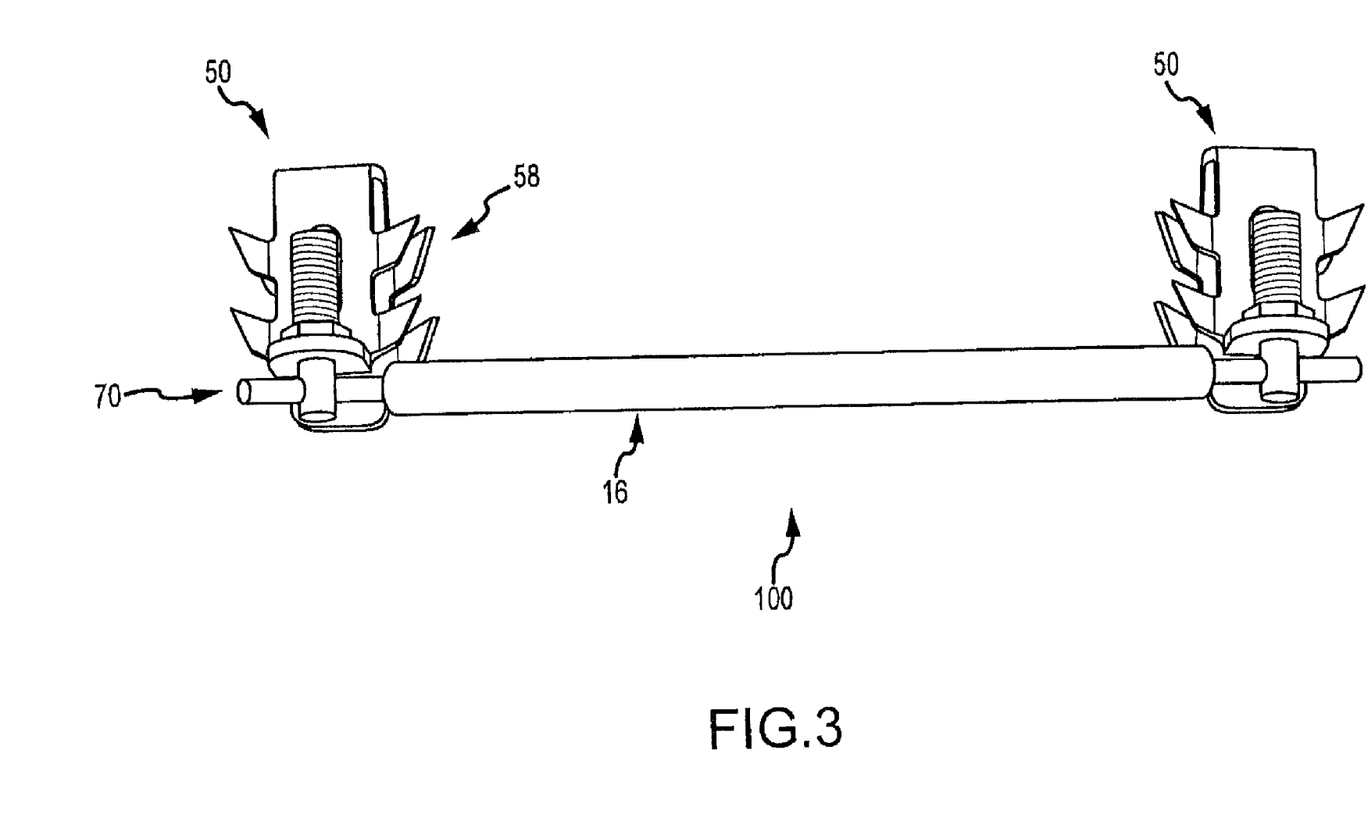
FIG. 3 shows a front perspective view of the connector of FIG. 2.

FIGS. 2 and 3 show an embodiment of a non-invasive signal line connector 100. As shown in FIG. 2, the signal line connector 100 attaches a signal line 16 to the surfaces of immediately adjacent track rails 40a and 40b to make electrical contact therebetween. Though illustrated as connecting immediately adjacent track rails it will be appreciated that aspects of the connector discussed herein may be utilized to connect a single-track rail to other electrical devices. In this regard, it will be appreciated that the signal line 16 of the connector 100 can be of any appropriate length.

As illustrated in FIGS. 2 and 3, the connector 100 is designed to connect to the flanges 42 of adjacent track rails 40a and 40b utilizing a pair of spring clamps 50. The spring clamps are interconnected by a signal line/conductor 16. It will be appreciated that in other embodiments the connector 100 may include a single spring clamp that is attached to one end of the signal line 16. In such an embodiment the other end of the signal, line may be attached to any electrical device. The signal line 16 may include an electrically conductive core (e.g., braided copper wire) and a nonconductive coating or sheath. In such an arrangement, a portion of the nonconductive coating can be removed from the signal line 16 to expose a portion of the electrically conductive core for conductive coupling with the spring clamp.

As shown in FIG. 2, it may be desirable to electrically interconnect rails 40A, 40B close to their junction 41. For such standard connections at the junctions of abutting rails, a connector may utilize first and second spring clamps that are interconnected by a short cable (e.g., less than about 18 inches) that is permanently affixed to each spring clamp 50.

In any arrangement, the spring clamps 50 of the signal line connectors 100 provided herein allow for quickly and conveniently interconnecting a signal line a flange 42 of the track rail 40. As will be described below, each spring clamp 50 can be forced over a portion of the track rail flange 42 to form a secure compressive coupling with the flange. The friction between teeth of the spring clamp completes an electrical interconnection between the signal line 16 and the track rail 40. Due to the strike-on design of the spring clamps, the signal line connector 100 allows for quickly and conveniently establishing electrical connections to track rails.

With reference to FIGS. 2-5, the spring clamp 50 of signal line connector 100 according to one embodiment will now be described. Generally, each spring clamp 50 includes a U-shaped body 58 that applies a compressive or clamping force about opposing portions of the rail flange 42 to secure the spring clamp 50 to the track rail 40. The U-shaped body 58 utilizes minimally invasive teeth 56 to form an electrical connection. The spring clamp 50 also includes and a signal line attachment portion 70 that is electrically connectable to the signal line 16.

Figure 4A:
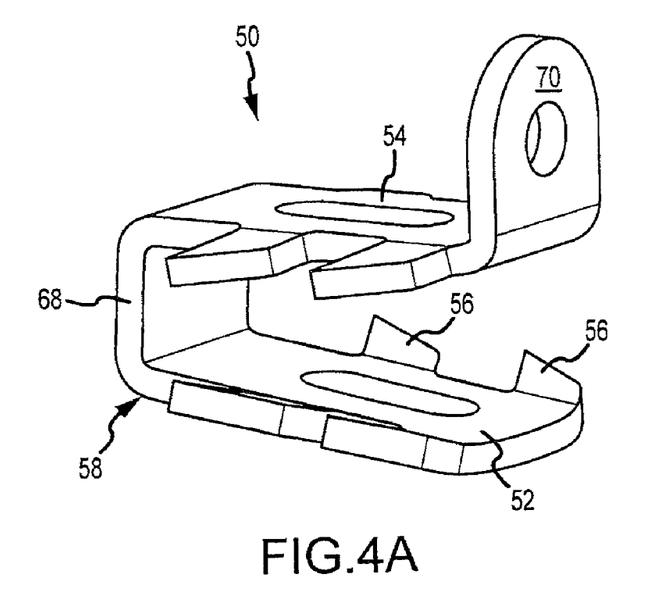
FIGS. 4A-4D shows various views of one embodiment of a spring clamp that may be utilized with the electrical connector of FIG. 2.
Figure 4B:
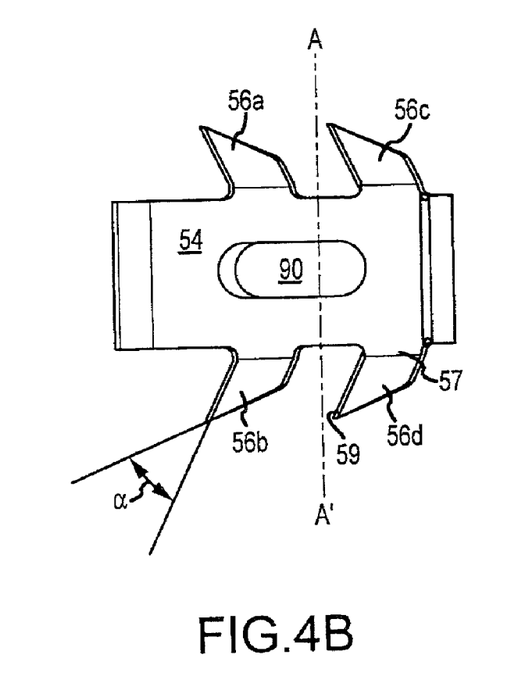
Figure 4C:
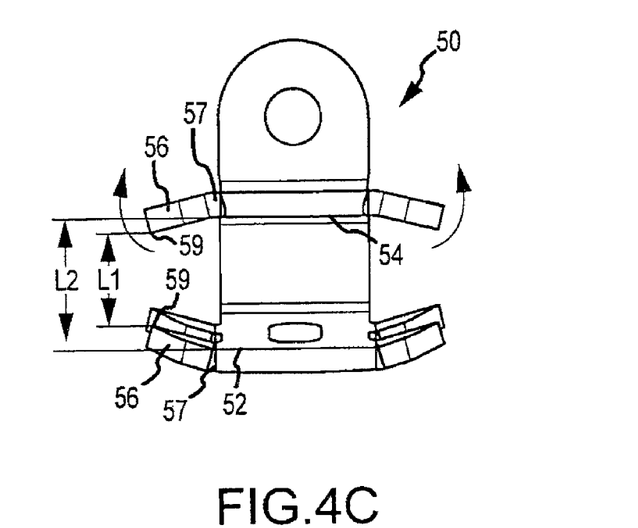
Figure 4D:
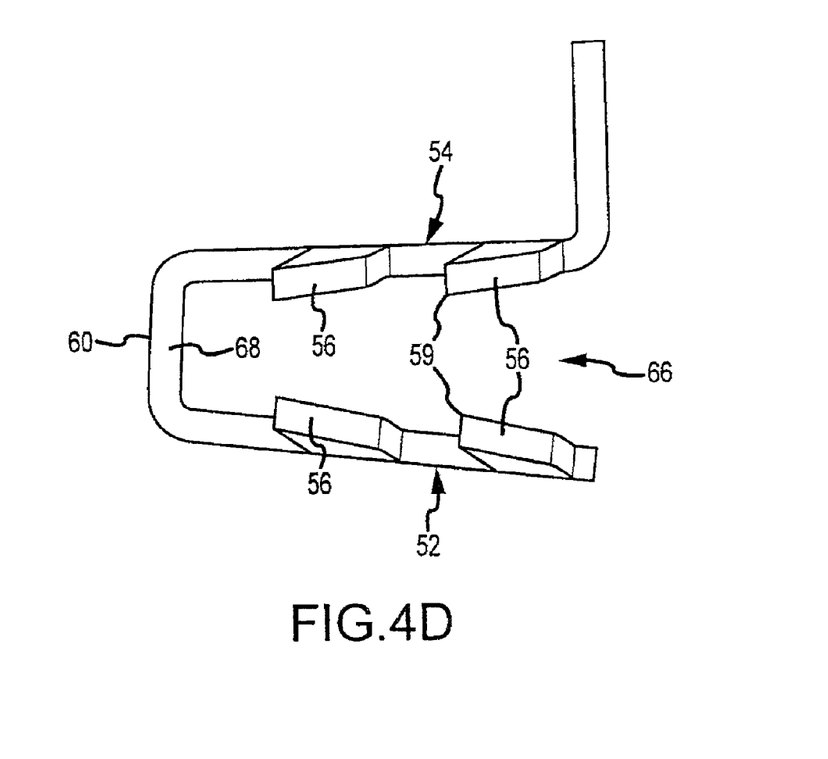
Figure 5:
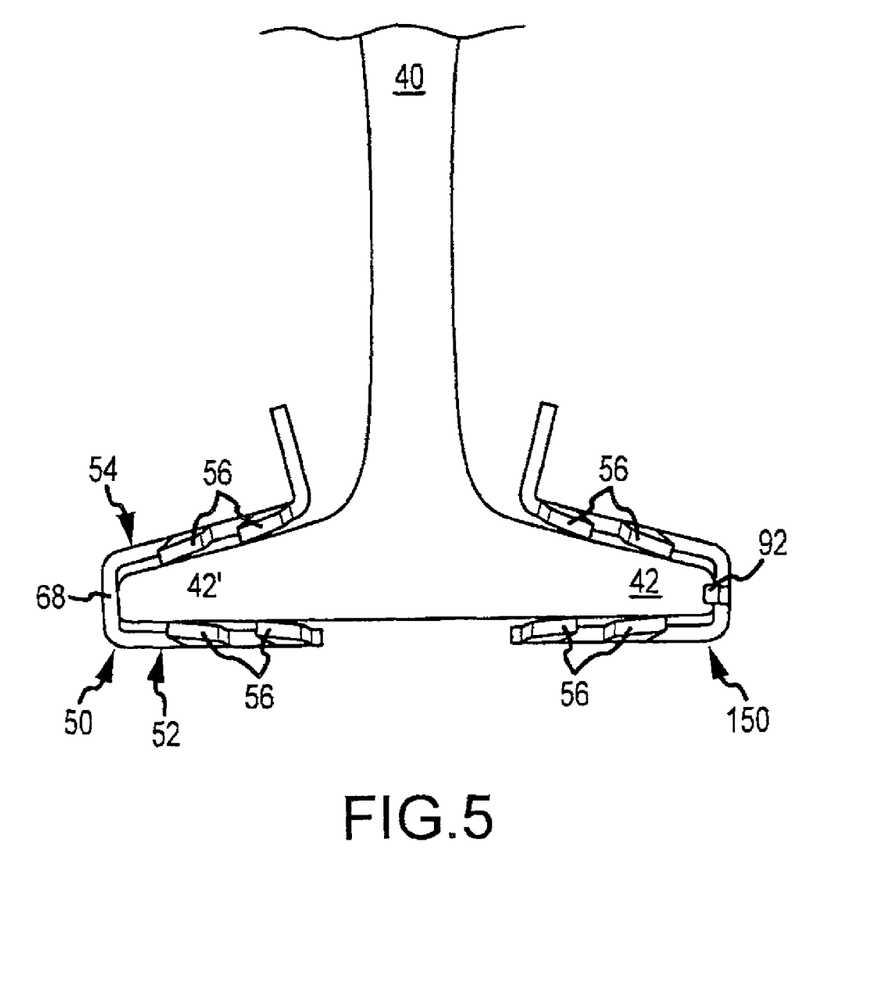
FIG. 5 shows a side view of the spring claim of FIGS. 4A-4D and 6A-6B as applied to a flange of a track rail.

As shown in FIGS. 4A-4D, the body 58 of the spring clamp 50 is a generally U-shaped member 58 that includes first and second opposing members 52, 54 for engaging top and bottom surfaces of the flange 42 of the track rail 40 (see, e.g., FIG. 5). As shown, the first and second opposing members 52, 54 define a receiving slot 66 (e.g., recess) that is sized to receive the flange 42 of the track rail 40. See FIGS. 4D and 5. The first and second opposing members 52, 54 are connected by a closed end 68 of the body 58. The U-shaped body 58 provides a bias or compressive (e.g. spring) force between the first and second opposing members 52, 54 that urges the first and second opposing members 52, 54 back toward a static position when these members are deflected outwardly from their static position. As such, at least a portion of the body 58 is elastically deformable. The term "elastically deformable" represents the deformation of a body by an applied stress, wherein the body returns to its original shape after the stress is removed.

The U-shaped body 58 may be formed of any material that imparts the desired elastic properties. That is, the material should provide enough elastic deformation to create a resilient spring-like retaining force to hold the U-shaped body 58 on the railroad flange 42. The closed end 68 may elastically deform to allow the first and second opposing members 52, 54 to slightly spread thereby allowing the flange to be inserted therebetween. Once inserted, a resilient retaining force caused by the elastic deformation of the body may compress the flange between the first and second opposing members 52, 54. In one arrangement, the elastically deformable U-shaped body is made of a metal plate bent into the U-shape and having a thickness of at least about one-eighth of an inch and more preferably of at least about three-sixteenths of an inch. In such an arrangement, the facing surfaces (e.g., inside surfaces) of the opposing members 52, 54 are substantially planar. However, this is not a requirement.

The outside surface of the closed end 68 of the U-shaped body 58 also forms a strike surface 60 to facilitate such disposition of the first and second opposing members about the flange 42. For instance, an installer may hit the strike surface 60 (see FIG. 4D) using a hammer or other appropriate device to drive the flange 42 into the slot 66. When the flange 42 is disposed within the slot 66, the first and second opposing members 52, 54 are slightly forced apart from a static position. This allows the opposing members to compress about opposing portions of the flange 42 and thereby secure the signal line connector 100 to the track rail.

To further prevent against inadvertent disengagement of the first and second opposing members 52, 54 from the flange 42 and to ensure electrical conductivity between the signal line connector 100 and the track rail 40, each of the first and second opposing members 52, 54 includes at least one tooth 56 that works to grip the flange and prevent removal of the signal line connector 100. With reference to FIGS. 4A-4D, each tooth 56 is subject to a number of characterizations. Generally, each tooth 56 has a base 57 that is integrally formed with one of the opposing members 52, 54 and a gripping tip 59 extends away from the base 57. Between their base 57 and gripping tip 59, each tooth 56 may be bent relative to the substantially planar surface of the member 52 or 54 to which it attaches. See FIG. 4C. In this regard, gripping tip 59 of a tooth 56 may extend partially into the slot 66 between the opposing members 52, 54.

By integrally forming the teeth with the body 58, the clamp 50 may be formed out of a single piece of metal. For instance, a sheet of metal may be stamped to define a flat connector having multiple teeth extending from one or more lateral edges thereof. As shown in FIG. 4C, these teeth may then be bent relative to the substantially planar surface defined by what becomes the inside opposing surfaces of the body 58. At this time, the flat elongate member may be bent into the U-shape as illustrated in FIGS. 4A through 4D. Forming the clamp 50 from a single piece of material simplifies the manufacturing thereof.

The gripping tips 59 of the teeth attached to the opposing members 52, 54 have a spacing L1 that is less than the spacing L2 between the opposing members. Upon forcing the flange 42 is into the recess 66, at least the gripping tips 59 of the teeth 56 rest on the surface of the track rail. See. FIG. 5. As best illustrated in FIG. 4B, one or more of the teeth 56 may also angle backwards from their base 57 to their gripping tip 59. That is, the teeth may be angled such that their tips 59 are disposed towards the closed end 68 of the U-shaped body 58. When the spring clamp 50 is disposed onto a track rail, such backwards swept teeth 56 are resistant to removal. That is, an attempt to pull the spring clamp 50 off of the track rail results in the gripping tips of these backwards swept teeth 56 being pulled into the surface of the flange and thus provides significant resistance to removal.

After application, the gripping tip 59 of each tooth 56 may rest on the surface of the track rail 40. See FIG. 5. However, during application, the reduced spacing L1 of the gripping tips 59 is such that these tips drag along the surface of the flange 42. This may result in one or more of the gripping tips 59 scratching the surface of the track rail. This provides a significant benefit in that scaling and/or oxidation on the surface of the track rail may be penetrated to provide more effective electrical contact with the signal line connector. That is, the gripping tips 59 may mar the surface of the track rails and expose metal on the rail to form an electrical connection between the rail and the clamp 50. While slightly marring the surface of the track rails, it will be appreciated, the location and minimal entry of the teeth into the track rail 40 does not affect the structural integrity of the track rail 40.

It may be preferred that the teeth 56 have a hardness in excess of that of the track rail 40 to allow the teeth 56 to effectively mar and subsequently grip the track rail 40. Accordingly, the hardness of the teeth 56 may be greater than the hardness of the portion of the track rail 40 to which they are designed to engage (e.g., the flange 42). In one embodiment, the teeth 56 have a Rockwell hardness of over about 40. In another embodiment, the teeth have a Rockwell hardness of about 60 or more.

In one arrangement, the gripping points 59 of the teeth 56 may be made a different material than of the rest of the spring clamp 50. For example, the tips of the teeth 56 may be individually formed and subsequently attached to the spring clamp 50 (e.g., carbide tips). Alternatively, the gripping tips 59 of the teeth 56 may be integrally formed with the spring clamp 50 and subsequently hardened utilizing any appropriate hardening method (e.g. flame hardening, induction hardening, case hardening, etc.). To provide a point that is sharp enough to allow the gripping tips 59 mar/engage the surface of flange 42 and create an effective electrical connection, it may be preferably that an included angle of the tooth that defines that tip 59 be an acute angle. In one arrangement, this included angle $\alpha$ is less than about 60° or even less than about 45°. See FIG. 4B. Use of such a sharp point in conjunction with a tooth thickness (e.g., plate thickness) of greater than one-eighth of an inch or more preferably three-sixteenths of an inch provides a very robust tooth that has enough structural rigidity to bite into the surface of the track rail. That is, thinner teeth tend not to have enough internal structure to effectively force the tip of the tooth into the hard surface of the track rail.

To reduce the likelihood of corrosion at the interface between the interface of the teeth 56 and the exposed metal of the track rail 40, various fluids or other substances (e.g. epoxy, oil, grease, sealants, coatings) can be applied near the junction of each tooth 56 and the track rail 40. Additionally or alternatively, the spring clamp 50 may have a sacrificial galvanic coating to prevent corrosion of the interface between the teeth and the track rail. In one particular arrangement, the clamp 50 is hot dipped galvanized. In this arrangement, the zinc coating effectively forms an anode, which sacrifices electrons to prevent the underlying metals (e.g., teeth and track rail) from corroding. It is believed that a well coated clamp may provide years of protection for the underlying metals in this application. Likewise, it is believed that the electrical connection formed by the spring clamp should remain viable for an extended period of time and potentially for the lifetime of the track rail.

To further enhance the gripping ability of the connector, it is preferably that the various teeth 56 are permitted to move at least partially independently relative to one another. That is, slight variations in the configuration of the track rail and/or surface imperfections thereof may result in the surface of the track rail not being identical between different rails. Accordingly, it is preferable that the teeth of the clamp 50 accommodate such imperfections.

To permit independent movement of the teeth, the connector 100 incorporates laterally extending teeth and/or a relief recess in the top and bottom members 52, 54. The relief recess 90 in the present embodiment is disposed along a central axis of the U-shaped body 58 and extends between opposing pairs of the teeth in the top and bottom members, respectively. This relief recess 90 in the present embodiment extends entirely through the respective member to provide an aperture. However it will be appreciated that the relief recess 90 need not extend entirely through the member. In any arrangement, the relief recess 90 permits opposing lateral teeth e.g., 56a and 56b as illustrated in FIG. 4B, to flex relative to one another more readily than if the upper member 54 were solid between these members. Furthermore, by laterally extending outwardly from the lateral edges of the top member 54, these opposing teeth 56a, 56b form cantilevered members the increased length of which allows for additional deflection between their tips and their base. The arrows in FIG. 4C illustrate the flexural movement of these teeth permitted by the relief recess 90. The use of the laterally extending teeth also increases the area over which the teeth engage the flange of the track rail. In this regard, the clamp is more resistant to twisting as the teeth provide an increased moment to turning forces.

The relief aperture further allows the front set of teeth 56c and 56d as illustrated in FIG. 4B to flex relative to the rearward set of teeth 56a, 56b about reference axis A-A$^1$ as illustrated in FIG. 4b. That is, as the upper member 54 has less structure between the front set of teeth and the back set of teeth (i.e., due to the relief aperture) than exists between the back set of teeth 56a and 56b and the closed end 68 of the clamp, the front set of teeth can independently flex relative to the back set of teeth. Though discussed primarily in relation to the top member 54, it will be appreciated that the lower member may also include a relief aperture that allows the various teeth interconnected thereto to flex in a manner similar to that discussed above. In any case, use of such relief apertures and/or laterally extending/cantilevered teeth permits independent movement of the teeth such that each tooth may engage the surface of the track rail even if the track rail contains surface imperfection.

While each of the first and second opposing members 52, 54 is shown as including four teeth 56, more or less than four teeth 56 can be utilized depending upon the specific application or operator preferences. Moreover, each tooth 56 can be of other appropriate shapes and dimensions and possess other appropriate orientations to effectively grip the track rail 40. For example, one or more teeth may additionally or alternatively extend from facing surfaces of each of the first and second opposing members 52, 54.

Figure 6A:
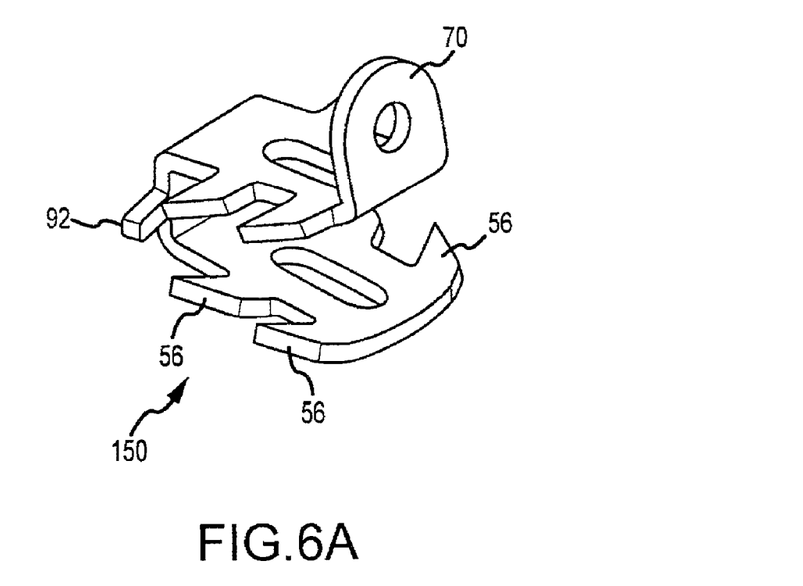
FIGS. 6A-6B show perspective and side views of another embodiment of a spring clamp.
Figure 6B:
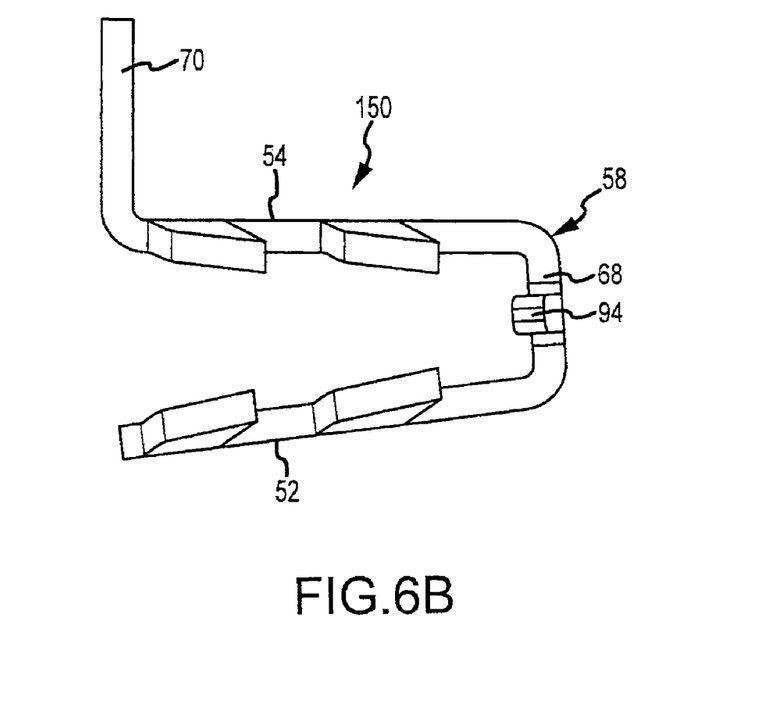

FIGS. 6a and 6b illustrate a further embodiment of a clamp 150 that shares many of the attributes discussed in relation to the connector 50 of FIGS. 1 through 4d. The primary difference is that this clamp 150 has spring tabs 92, 94 that extend laterally outward from the closed end 68 of the U-shaped body 58. Similarly to the laterally extending teeth, these spring tabs 92, 94 have a based that is integrally formed with the body 58 and a tip that is designed to engage the track rail. The purpose of these spring tabs 92, 94 is not to grip the rail but rather to limit the movement of the connector 100 relative to the track rail. As illustrated on the right hand side of FIG. 5, the connector 150 may be advanced onto the flange until the spring tabs 92, 94 engage the outside edge of the flange 42. These spring tabs then limit the advancement of the connector toward the track rail to help correctly position the clamp. As above, such spring tabs 92, 94 may be formed during a die stamping and bending process.

Figure 7:
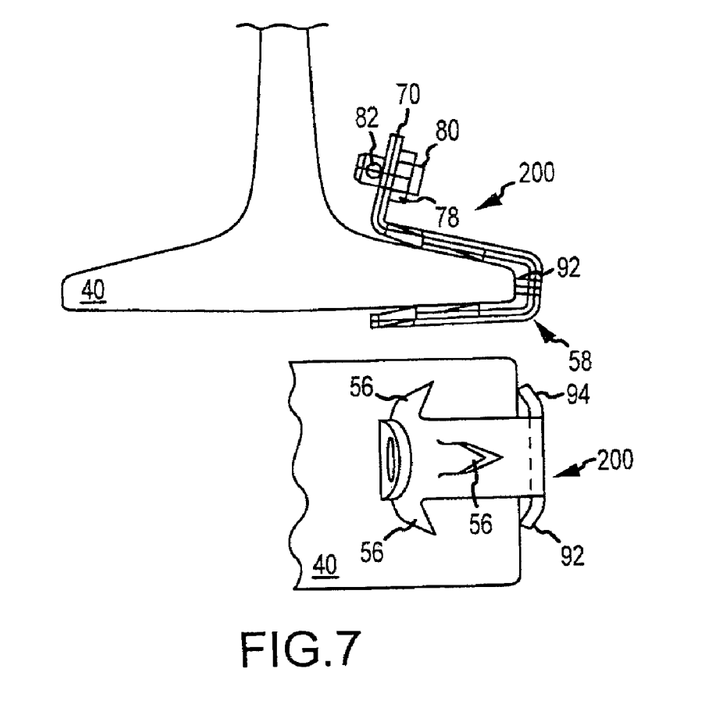
FIG. 7 illustrates a further embodiment of a spring clamp.
Figure 8:
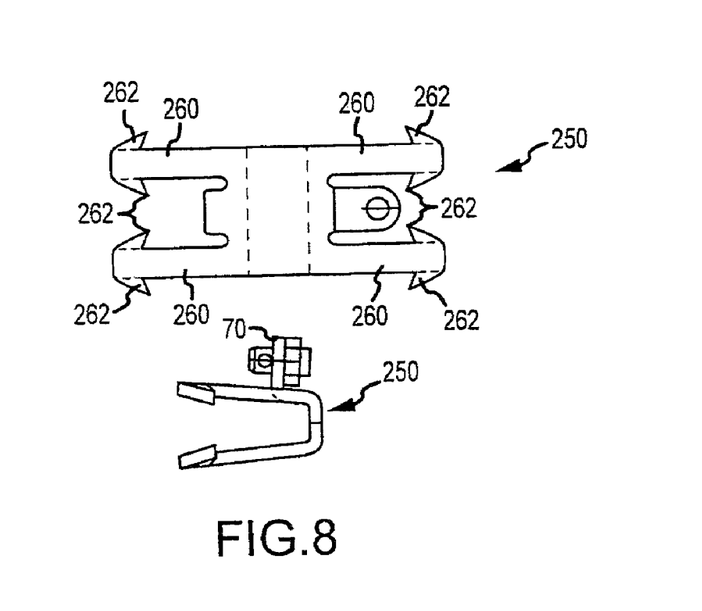
FIG. 8 illustrates a yet further embodiment of a spring clamp.

Though discussed primarily in respect to clamps having opposing outwardly (e.g., laterally) extending teeth, it will be appreciated that variations exist. For instance, FIG. 7 illustrates a clamp 200 that utilizes three teeth 56 on the upper and lower members to provide a secure connection to the track rail 40. As shown, a first set of opposing teeth are disposed on each member and a central tooth is formed through the middle of the upper and/or lower body of this U-shaped member 58. FIG. 8 illustrates a clamp 250 where individual gripping arms 260 include opposing teeth 262. In this arrangement the U-shaped member includes four opposing gripping arms 260 that each includes two teeth 262. FIG. 8 also illustrates a clamp after stamping and prior to being bent into a U-shape. In any of these embodiments, the clamp may utilize integrally formed teeth that have a base section that are integrally formed with the elastically deformable U-shaped body.

Referring again to FIGS. 2-8, each spring clamp may additionally include a signal line attachment portion 70 that may serve to structurally and electrically (conductively) connect a signal line to the spring clamp and ultimately to the track rail 40. The signal line attachment portion 70 may include an upstanding tang 72. This tang 72 can be formed separately from the mounting portion 58 and then appropriately attached thereto (e.g. via welding) or may be integrally formed with the clamp. Regardless of how the upstanding tang 72 is formed or shaped, it serves to as a location to mount the signal line 16 to the clamp.

In one embodiment, the signal line is removably attached to the spring clamp. In this embodiment, a fastener extends through an aperture in the upstanding tang 72. See e.g., FIG. 7. The fastener 78 may be in the form of a bolt, screw and the like, and can include a threaded portion 80 and an aperture 82. The fastener 78 can be inserted or otherwise positioned through an aperture in the upstanding tang 70 before or after the clamp is applied to the rail. An exposed core of the signal line can be inserted through the aperture 82 and a nut can be threaded onto the threaded portion 80 of the fastener 78. At this point, the signal line 16 is in secure structural and electrical contact with the spring clamp. As such, once the clamp is appropriately mounted to a portion of the track rail 40, the signal line 16 will be electrically connected to the track rail. To remove the signal line 16 from the spring clamp 50, a user may loosen the nut and pull a portion of the fastener 78 through the bore such that exposed core 18 is not compressed against the front surface 74. At this point, the signal line 16 can be removed. In other embodiments, the signal line 16 can be permanently attached to the signal line connector 100. For instance, a signal line or cable may be welded, brazed, adhered (e.g., using a conductive epoxy) or otherwise connected to the upstanding tang 72.

To prevent against rusting or oxidation, the various components of the signal line connector 100 can be appropriately coated or otherwise conditioned. For instance, the spring clamp and/or the connection between the spring clamp and a signal line can be hot-dip galvanized (e.g., with a layer of zinc) to inhibit corrosion therebetween. In other embodiments, the connection between the spring clamp and the signal line can be electroplated (e.g., nickel) or dip coated in a layer of thermoplastic. Further other materials or substances may be applied in any appropriate manner to prevent contact with air and/or moisture.

In order to provide a desired clearance between the signal line 16 and the surface of the track rail 40, the physical configuration of any or all of the components of the various spring clamps may be altered. For instance, the height of the upstanding tang 72 may be increased. That is, by increasing the height of the upstanding tang 72, additional clearance may be provided between the signal line 16 and the top surface of the flange 42 of the track rail 40. Alternatively or additionally, the length of the opposing members can be altered to correspondingly change the clearance between the signal line 16 and a neck portion of the track rail 40.

Figure 9:
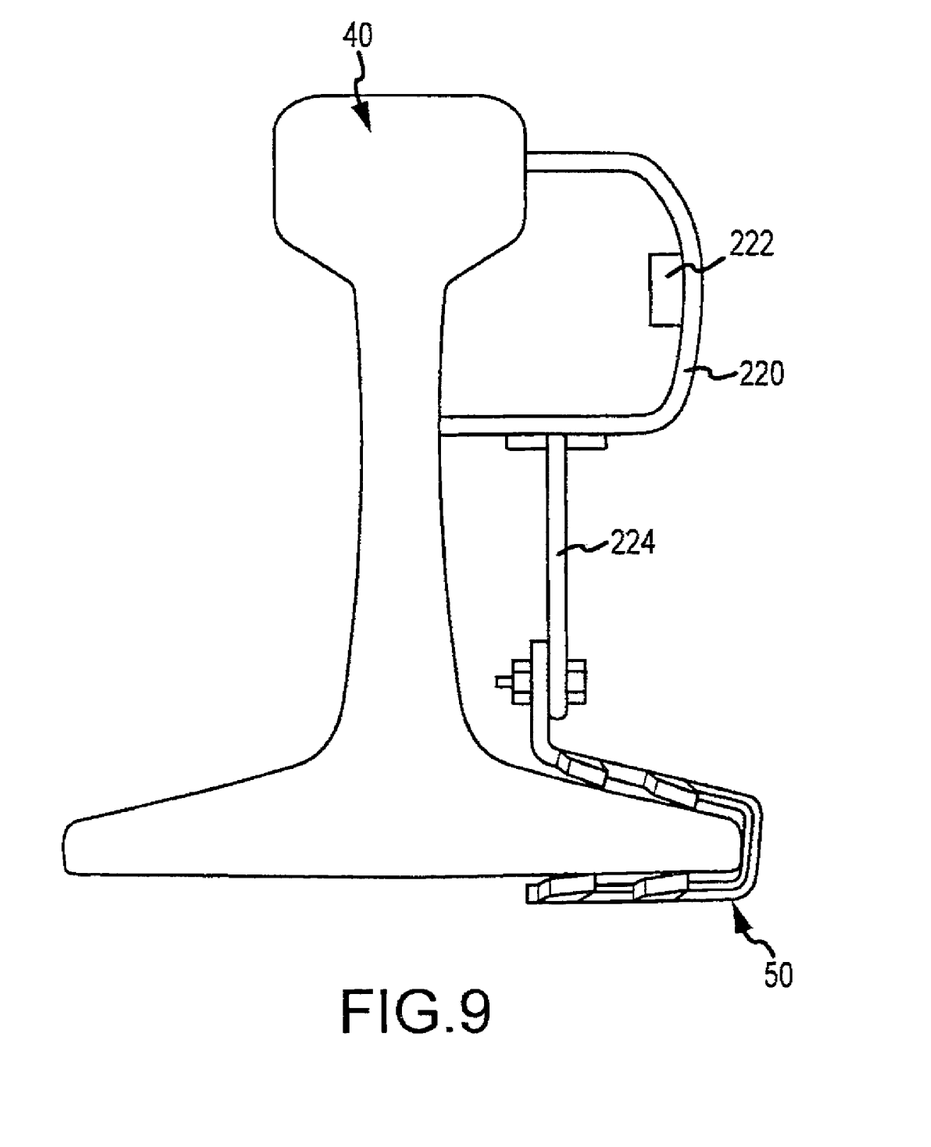
FIG. 9 illustrates utilizing the spring clamp to hold a component relative to track rail.

FIG. 9 illustrates use of the spring clamp 50 of FIGS. 4A-4D to support a component relative to the track rail. That is, rather than making an electrical connection with the track rail, the clamp is utilized to attach a component/element relative to the rail. In this particular embodiment, the clamp supports a track rail heater assembly relative to the track rail 40. That heater assembly includes a hood member 220 that extends along a portion of the length of the track rail and provides an at least partially enclosed interior that houses an electrical heater 222. Generally, the hood member 220 is an elongated member the length of which may be chosen to accommodate the length of a particular heater. In addition, end plates (not shown) may be provided to substantially cover the ends of the hood member. This may reduce convective heat loss to the ambient environment. In the present embodiment, an upper portion of the hood member 220 is adapted to engage the head flange of the track rail 40 and a lower portion of the hood member is adapted to engage a web portion of the track rail 40. That is, a first contact surface contacts the head flange and a second contact surface contacts the web. Accordingly, this may require that the hood member be suspended above the foot of track rail. In the present embodiment, the hood member includes a lower connecting link 224 that is bolted to the upstanding tang 70, which provides a connection point for the clamp. It will be appreciated that in this embodiment, two or more clamps may be disposed along the length of the heater assembly.

In further arrangements, aspects of the clamp may be utilized to, for example, hold ties underlying the track rail in place. In such an arrangement, the clamp may include a downwardly extending tang or stud that may engage, for example, a side surface of an underlying tie. This downwardly extending member may likewise be attached to the underlying tie, though this is not a requirement.

The foregoing description has been presented for purposes of illustration and description. Furthermore, the description is not intended to limit the invention to the form disclosed herein. Consequently, variations and modifications commensurate with the above teachings, and skill and knowledge of the relevant art, are within the scope of the various embodiments. The embodiments described hereinabove are further intended to explain best modes known of practicing the invention and to enable others skilled in the art to utilize the invention in such, or other embodiments and with various modifications required by the particular application(s) or use(s) of the various embodiments. It is intended that the appended claims be construed to include alternative embodiments to the extent permitted by the prior art.

The invention claimed is:

1. A spring clamp electrical connector for making an electrical connection with a railroad track rail, comprising:
    a continuous U-shaped body defining an upper member, a lower member and a closed end, wherein a bottom surface of the upper member and a top surface of the lower member are disposed in a spaced and opposing relationship sized to receive a flange of the railroad track rail, and wherein each of the upper and lower members comprises first and second spaced a lateral free edges that respectively define first and second spaced lateral boundary lines;
    at least a first upper tooth having a base integrally formed with one of the first and second lateral free edges of the upper member and extending laterally away from and beyond the respective first or second lateral boundary line from the upper and lower members to a gripping tip, wherein the gripping tip of the upper tooth extends below the bottom surface of the upper member, wherein the gripping tip has a Rockwell hardness of at least 60;
    at least a first lower tooth having a base integrally formed with one of the first and second lateral free edges of the lower member and extending laterally away from and beyond the respective first or second lateral boundary line from the upper and lower members to a gripping tip, wherein the gripping tip of the lower tooth extends above the top surface of the lower member, wherein the gripping tip has a Rockwell hardness of at least 60; and
    a signal cable electrically connected to the U-shaped body.

2. The electrical connector of claim 1, wherein the U-shaped body comprises:
    a metal plate bent into the U-shape, wherein the upper member, lower member and the closed end each have common thickness.

3. The electrical connector of claim 1, further comprising:
    a second tooth being disposed on one of the upper and lower members.

4. The electrical connector of claim 3, wherein the upper or lower member having first and second teeth further comprises:
    an aperture extending through the member, wherein at least a portion of the aperture is disposed between the bases of the first and second teeth.

5. The electrical connector of claim 1, wherein at least one of the upper and lower members includes:
    a least four upper teeth each having a gripping tip that extends either below the bottom surface or above the top surface, respectively, wherein points of the gripping tips are disposed in a common plane.

6. The electrical connector of claim 1, wherein the conductor wire is permanently and attached to the body.

7. The electrical connector of claim 1, wherein at least the gripping tip of one of the upper tooth and the lower tooth extends from its base to a point directed toward the closed end of the U-shaped member and away from an open end of the U-shaped member.

8. The electrical connector of claim 1, further comprising a galvanic coating.

9. The electrical connector of claim 1, further comprising a nickel coating.

10. The electrical connector of claim 1, wherein the gripping tip at least one of the upper tooth and the lower tooth is defined by first and second edges, wherein the angle included between the edges is an acute angle.

11. The electrical connector of claim 10, wherein the acute angle is equal to or less than 60 degrees.

12. The electrical connector of claim 1, wherein the signal cable is removeably connected to the U-shaped body.

13. The electrical connector of claim 1, further comprising:
at least one spring tab extending from a lateral edge of the closed end of the U-shaped member, wherein a tip of the spring tab extents in a direction towards the upper and lower members.

14. A spring clamp electrical connector for making an electrical connection between adjacent track rails, comprising:
a first U-shaped spring clamp having an upper member, a lower member, a closed end, and a recess sized to receive a portion of a track rail, wherein each of the upper and lower members comprises a body that is defined by respective generally parallel lateral free edges, wherein the first clamp has having at least one tooth that is connected to one of the a lateral free edges of the a body of one of the upper and lower members the first U-shaped spring clamp and that extends away from the body so as to cantilever from the body;
a second U-shaped spring clamp having an upper member, a lower member, a closed end, and a recess sized to receive a portion of a track rail, wherein each of the upper and lower members comprises a body that is defined by respective generally parallel lateral free edges, wherein the second clamp has having at least one tooth that is connected to one of the a lateral free edges of the a body of the second U-shaped clamp and extends away from the body so as to cantilever from the body; and
a cable having a first end connected to the first spring clamp and a second end connected to the second spring clamp.

15. The electrical connector of claim 14, wherein at a least the tips of the teeth are hardened to have a Rockwell hardness of at least 60.

16. A spring clamp electrical connector for making an electrical connection with a railroad track rail, comprising:
a continuous U-shaped body having an upper member, a lower member and a closed end defining a recess sized to receive a track rail flange, wherein each of the upper and lower members comprises a body that is defined by respective generally parallel lateral free edges;
at least a first upper tooth having a base integrally formed with the upper member and extending laterally outward from one of the a lateral free edges of the upper member and away from the lower member to define a cantilevered upper tooth, wherein a gripping tip of the upper tooth extends downwardly toward the recess;
at least a first lower tooth having a base integrally formed with the lower member and extending laterally outwardly from one of the a lateral free edges of the lower member and away from the upper member to define a cantilevered lower tooth, wherein the gripping tip of the lower tooth upwardly toward the recess; and
a signal cable electrically connected to the spring clamp.

17. The electrical connector of claim 16, further comprising:
at least one spring tab extending from a lateral edge of the closed end of the U-shaped member, wherein a tip of the spring tab extents forward toward the recess.

18. The electrical connector of claim 16, wherein the gripping tip of at least one tooth extends from its base in a direction toward the closed end of the U-shaped body.

19. The electrical connector of claim 16, wherein the gripping tip at least one of the tooth is defined by first and second edges, wherein the angle included between the edges is an acute angle.

\* \* \* \* \*